United States Patent
Nam et al.

(10) Patent No.: US 8,369,206 B2
(45) Date of Patent: Feb. 5, 2013

(54) CELL-SPECIFIC SHIFTING OF REFERENCE SIGNALS IN MULTI-STREAM TRANSMISSIONS

(75) Inventors: Young-Han Nam, Richardson, TX (US); Jianzhong Zhang, Irving, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 360 days.

(21) Appl. No.: 12/709,347

(22) Filed: Feb. 19, 2010

(65) Prior Publication Data

US 2010/0246376 A1  Sep. 30, 2010

Related U.S. Application Data

(60) Provisional application No. 61/210,960, filed on Mar. 25, 2009.

(51) Int. Cl.
*H04J 11/00* (2006.01)

(52) U.S. Cl. ..................................... 370/208; 375/260

(58) Field of Classification Search .......... 370/203–210; 375/260
See application file for complete search history.

(56) References Cited

U.S. PATENT DOCUMENTS

| | | | |
|---|---|---|---|
| 7,379,741 B2 | 5/2008 | Ahn et al. | |
| 2007/0270273 A1* | 11/2007 | Fukuta et al. | 475/206 |
| 2008/0080476 A1 | 4/2008 | Cho et al. | |
| 2008/0260062 A1* | 10/2008 | Imamura | 375/267 |
| 2009/0268670 A1 | 10/2009 | Kim et al. | |

FOREIGN PATENT DOCUMENTS

| KR | 1020060038305 A | 5/2006 |
|---|---|---|
| KR | 1020080039788 A | 5/2008 |

OTHER PUBLICATIONS

International Search Report dated Nov. 1, 2010 in connection with International Patent Application No. PCT/KR2010/001840.

* cited by examiner

*Primary Examiner* — Pao Sinkantarakorn

(57) ABSTRACT

A base station is provided. The base station comprises a downlink transmit path comprising circuitry configured to transmit a plurality of reference signals in one or more subframes. Each subframe comprises one or more resource blocks. Each resource block comprises S Orthogonal Frequency Division Multiplexing (OFDM) symbols. Each of the S OFDM symbols comprises N subcarriers, and each subcarrier of each OFDM symbol comprises a resource element. The base station further comprises a reference signal allocator configured to allocate the plurality of reference signals to selected resource elements of a resource block, and circularly shift the plurality of reference signals in a time domain of the resource block by an $h_{shift}$ value that is based at least partly upon a cell_ID of the base station.

20 Claims, 14 Drawing Sheets

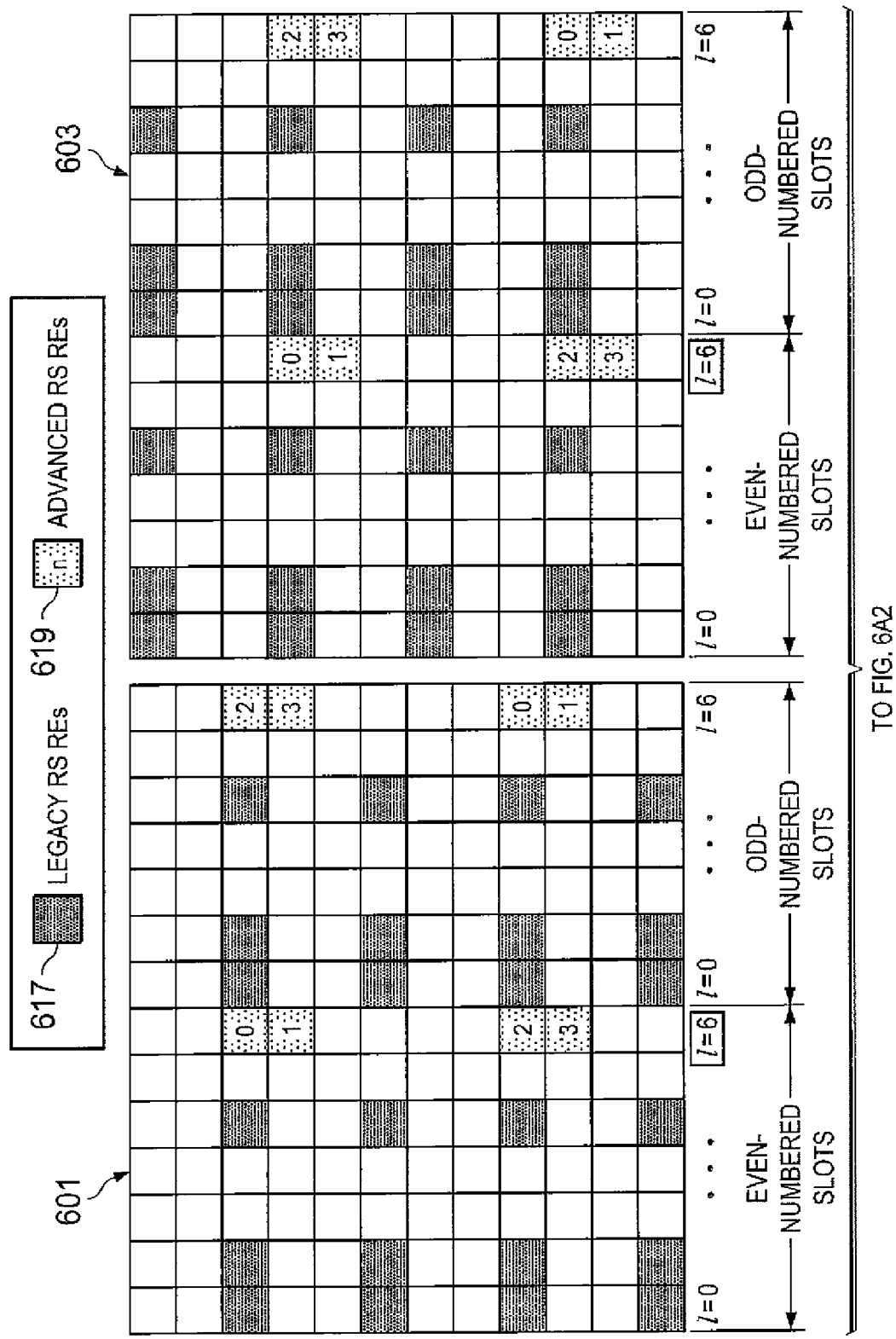
FIG. 6A1

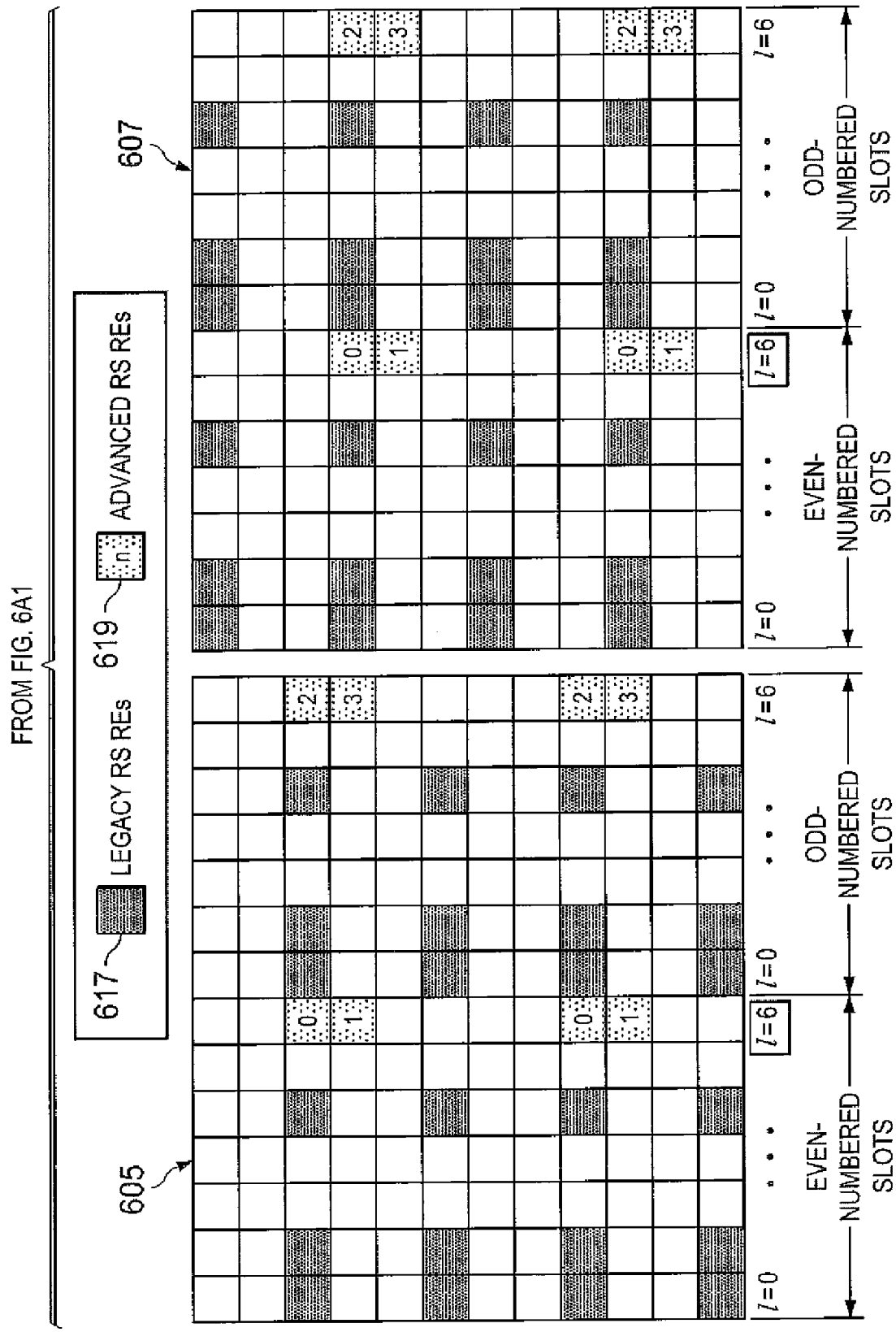
FIG. 6A2

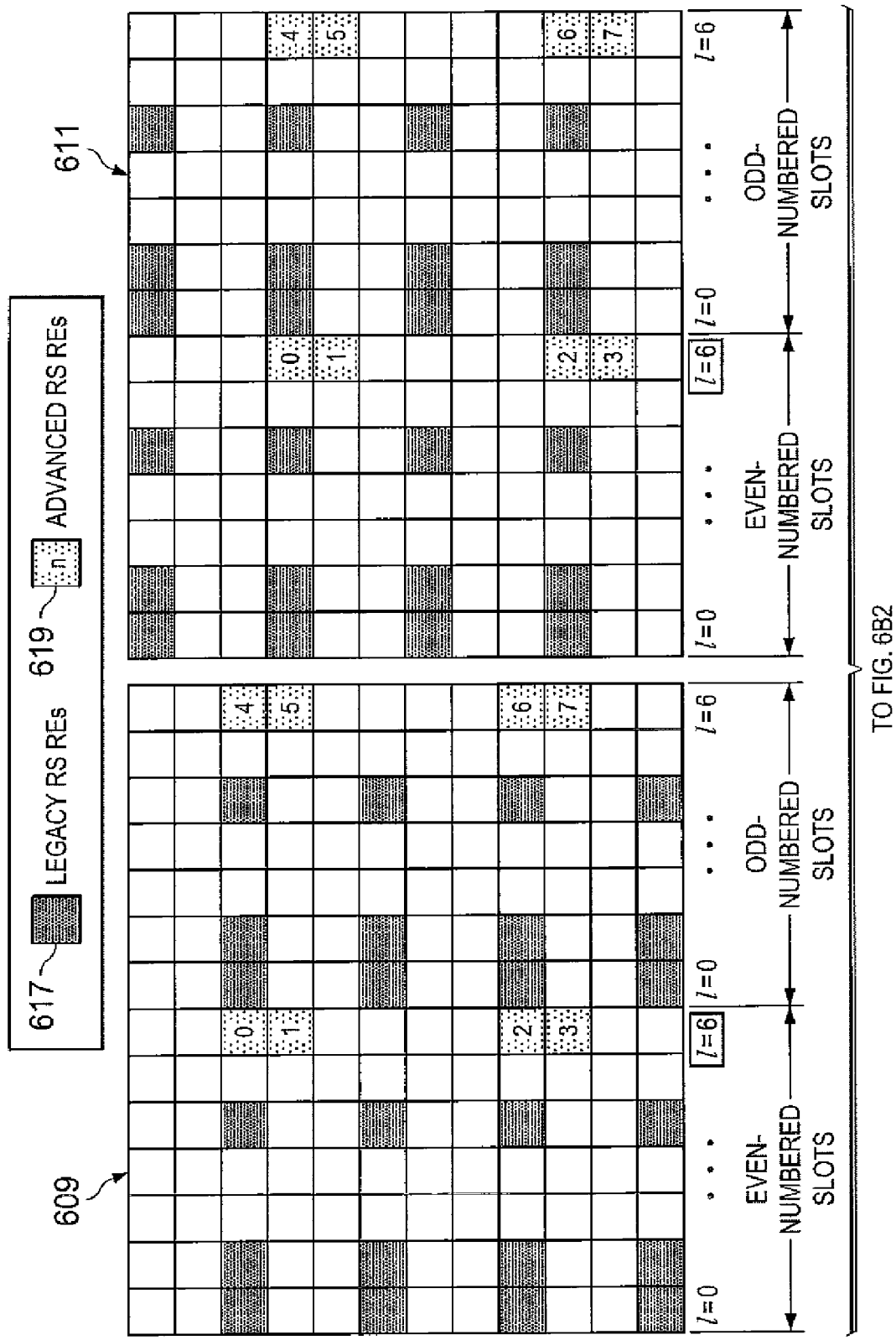
FIG. 6B1

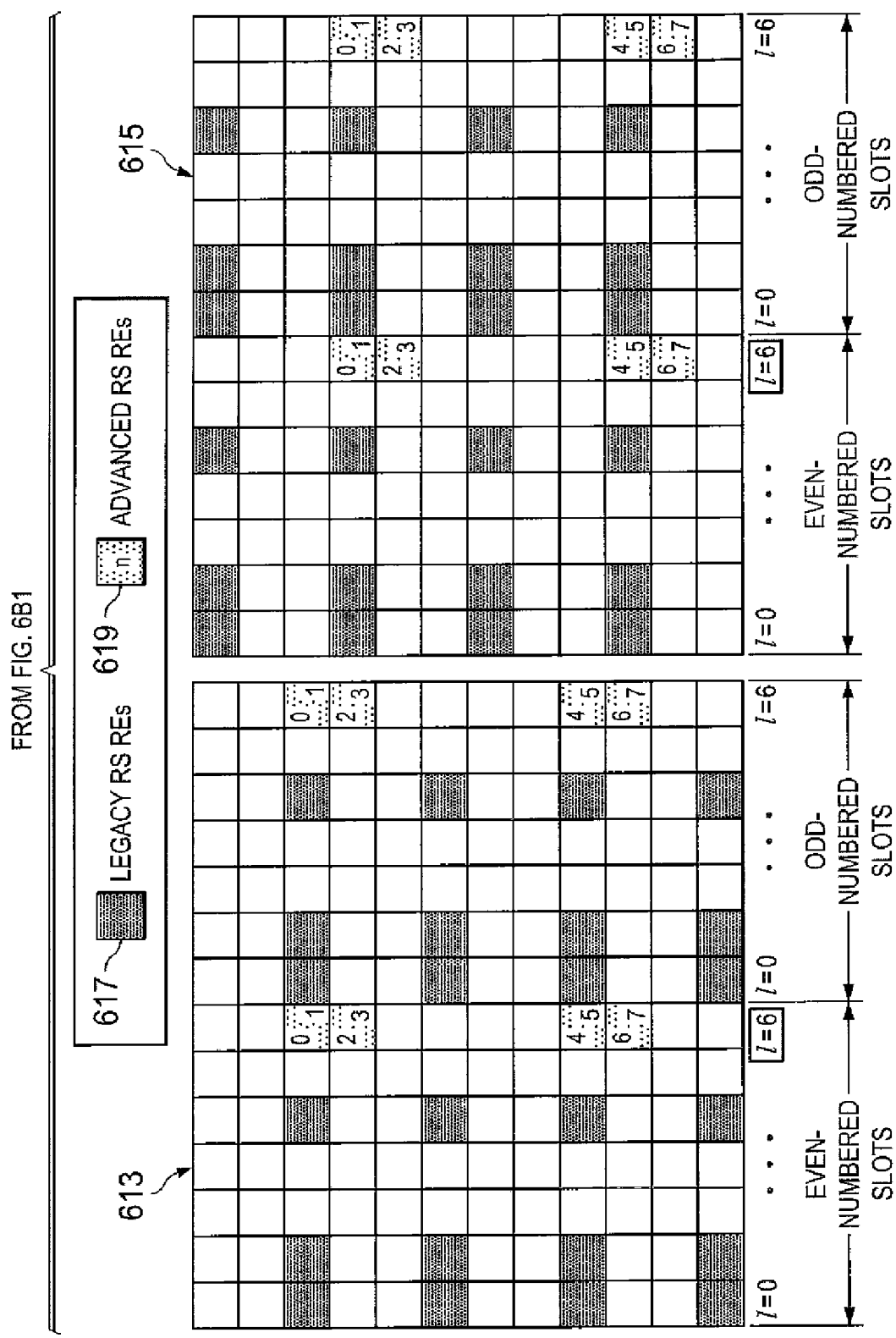
FIG. 6B2

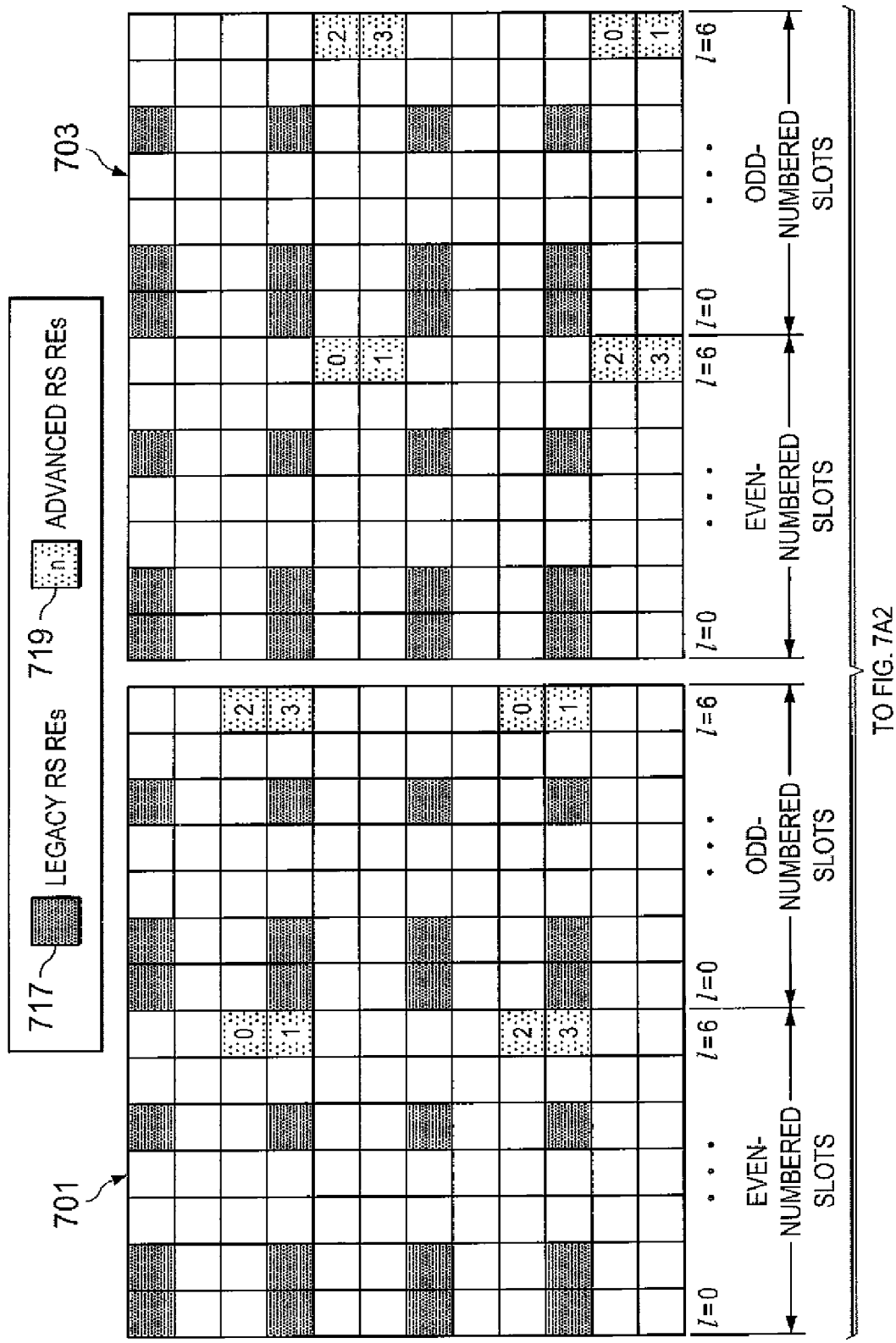
FIG. 7A1

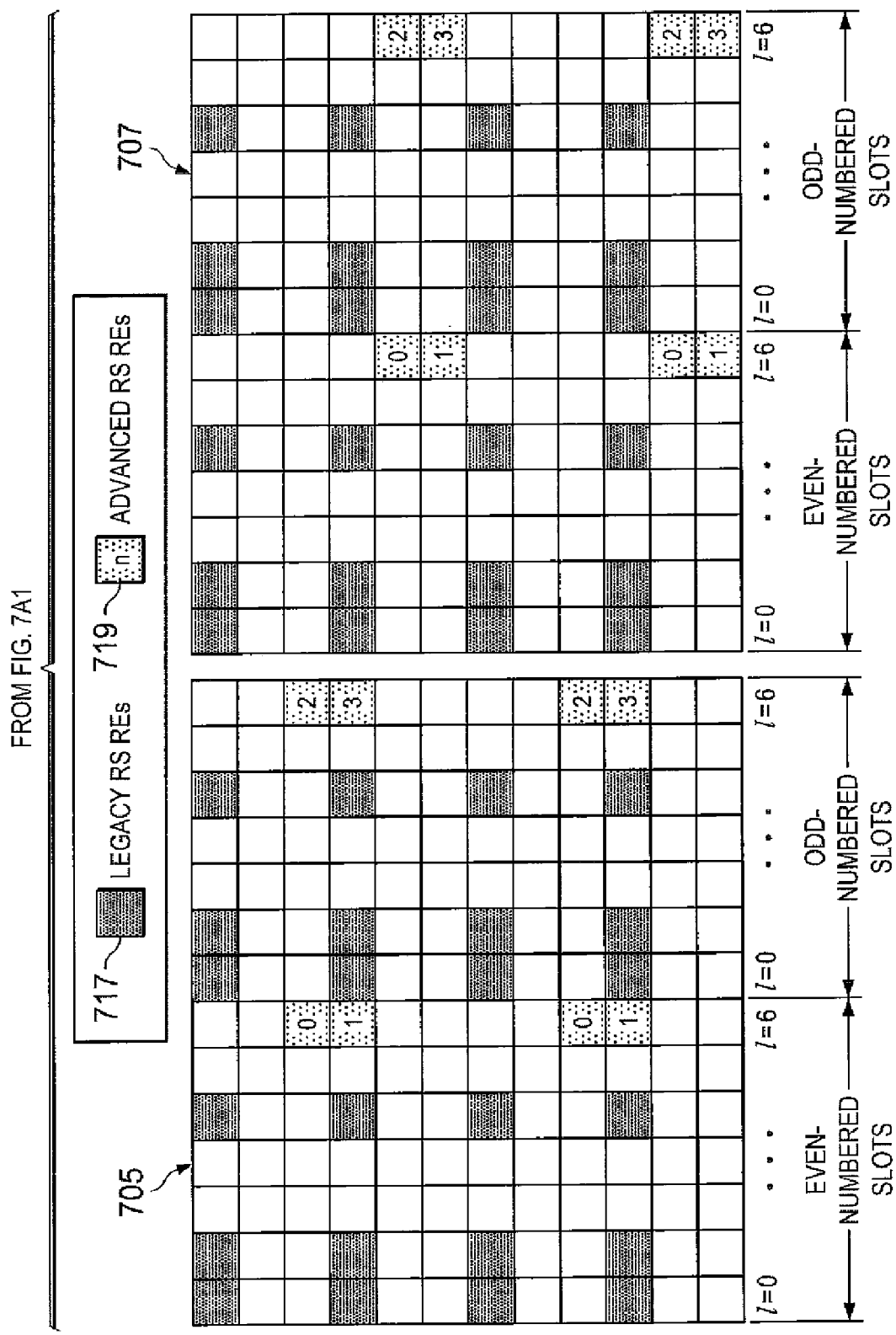
FIG. 7A2

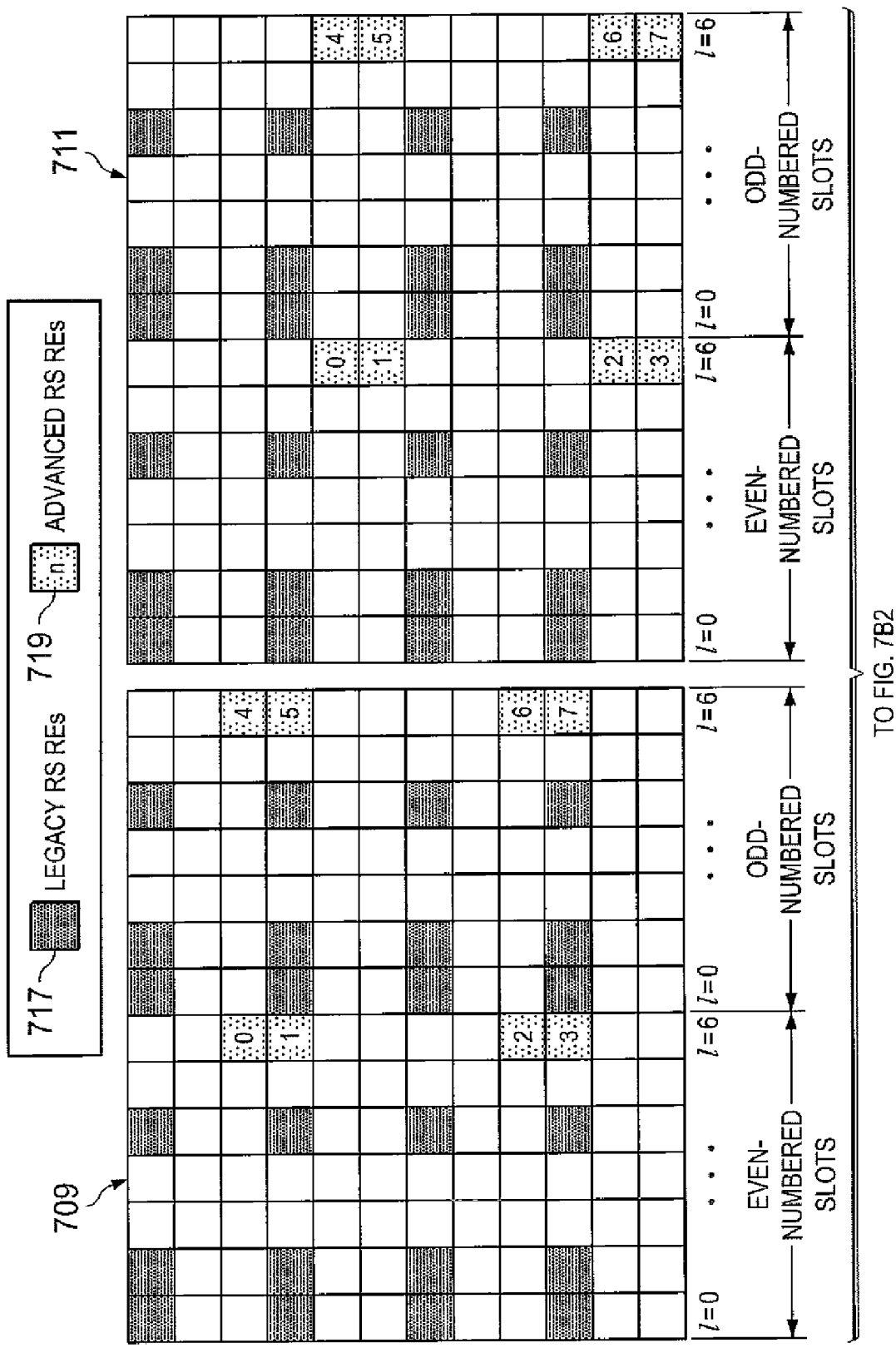
FIG. 7B1

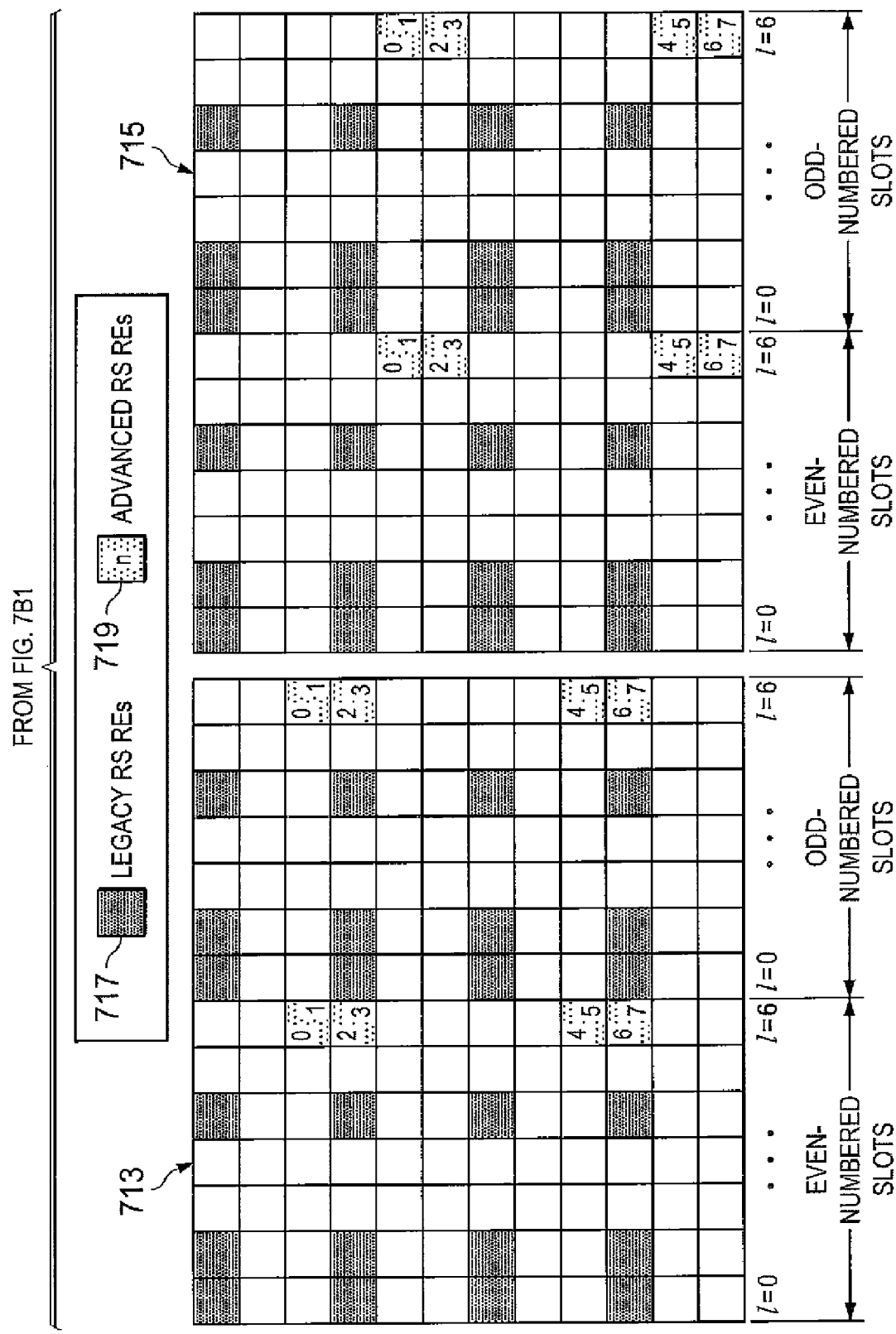
FIG. 7B2

CELL-SPECIFIC SHIFTING OF REFERENCE SIGNALS IN MULTI-STREAM TRANSMISSIONS

CROSS-REFERENCE TO RELATED APPLICATION(S) AND CLAIM OF PRIORITY

The present application is related to U.S. Provisional Patent Application No. 61/210,960, filed Mar. 25, 2009, entitled "CELL-SPECIFIC SHIFTING OF REFERENCE SIGNALS FOR MULTI-STREAM IN OFDM SYSTEMS". Provisional Patent Application No. 61/210,960 is assigned to the assignee of the present application and is hereby incorporated by reference into the present application as if fully set forth herein. The present application hereby claims priority under 35 U.S.C. §119(e) to U.S. Provisional Patent Application No. 61/210,960.

TECHNICAL FIELD OF THE INVENTION

The present application relates generally to wireless communications and, more specifically, to a method and system for cell-specific shifting of reference signals.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station comprises a downlink transmit path comprising circuitry configured to transmit a plurality of reference signals in one or more subframes. Each subframe comprises one or more resource blocks. Each resource block comprises S Orthogonal Frequency Division Multiplexing (OFDM) symbols. Each of the S OFDM symbols comprises N subcarriers, and each subcarrier of each OFDM symbol comprises a resource element. The base station further comprises a reference signal allocator configured to allocate the plurality of reference signals to selected resource elements of a resource block, and circularly shift the plurality of reference signals in a time domain of the resource block by an $h_{shift}$ value that is based at least partly upon a cell_ID of the base station.

A subscriber station is provided. The subscriber station comprises a downlink receive path comprising circuitry configured to receive a plurality of reference signals in one or more subframes. Each subframe comprises one or more resource blocks. Each resource block comprises S Orthogonal Frequency Division Multiplexing (OFDM) symbols. Each of the S OFDM symbols comprises N subcarriers, and each subcarrier of each OFDM symbol comprises a resource element. The subscriber station further comprises a reference signal receiver configured to receive the plurality of reference signals allocated to selected resource elements of a resource block. Prior to reception by the subscriber station, the plurality of reference signals are circularly shifted in a time domain of the resource block by an $h_{shift}$ value that is based at least partly upon a cell_ID of a base station.

A base station is provided. The base station comprises a downlink transmit path comprising circuitry configured to transmit a plurality of reference signals in one or more subframes. Each subframe comprises one or more resource blocks. Each resource block comprises S Orthogonal Frequency Division Multiplexing (OFDM) symbols. Each of the S OFDM symbols comprises N subcarriers, and each subcarrier of each OFDM symbol comprises a resource element. The base station further comprises a reference signal allocator configured to allocate the plurality of reference signals to selected resource elements of a resource block and group the selected resource elements into one or more sub-groups. Each of the one or more sub-groups has two or more contiguous resource elements in a frequency domain, and each of the one or more sub-groups has a same m number of resource elements. The reference signal allocator is further configured to circularly shift each of the one or more sub-groups of resource elements in the frequency domain by a $v_{shift}$ value, the $v_{shift}$ value being an integer multiple of the m number of resource elements in each of the one or more sub-groups.

A subscriber station is provided. The subscriber station comprises a downlink receive path comprising circuitry configured to receive a plurality of reference signals in one or more subframes. Each subframe comprises one or more resource blocks. Each resource block comprises S Orthogonal Frequency Division Multiplexing (OFDM) symbols. Each of the S OFDM symbols comprises N subcarriers, and each subcarrier of each OFDM symbol comprises a resource element. The subscriber station further comprises a reference signal receiver configured to receive the plurality of reference signals allocated to selected resource elements of a resource block. Prior to reception by the subscriber station, the selected resource elements are grouped into one or more sub-groups, and each of the one or more sub-groups has two or more contiguous resource elements in a frequency domain. Each of the one or more sub-groups has a same m number of resource elements, and each of the one or more sub-groups of resource elements are circularly shifted in the frequency domain by a $v_{shift}$ value. The $v_{shift}$ value is an integer multiple of the m number of resource elements in each of the one or more sub-groups.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A1, 6A2, 6B1 and 6B2 illustrate reference signal mapping patterns circularly shifted according to embodiments of the present disclosure;

FIGS. 7A1, 7A2, 7B1 and 7B2 illustrate reference signal mapping patterns circularly shifted according to further embodiments of the present disclosure;

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
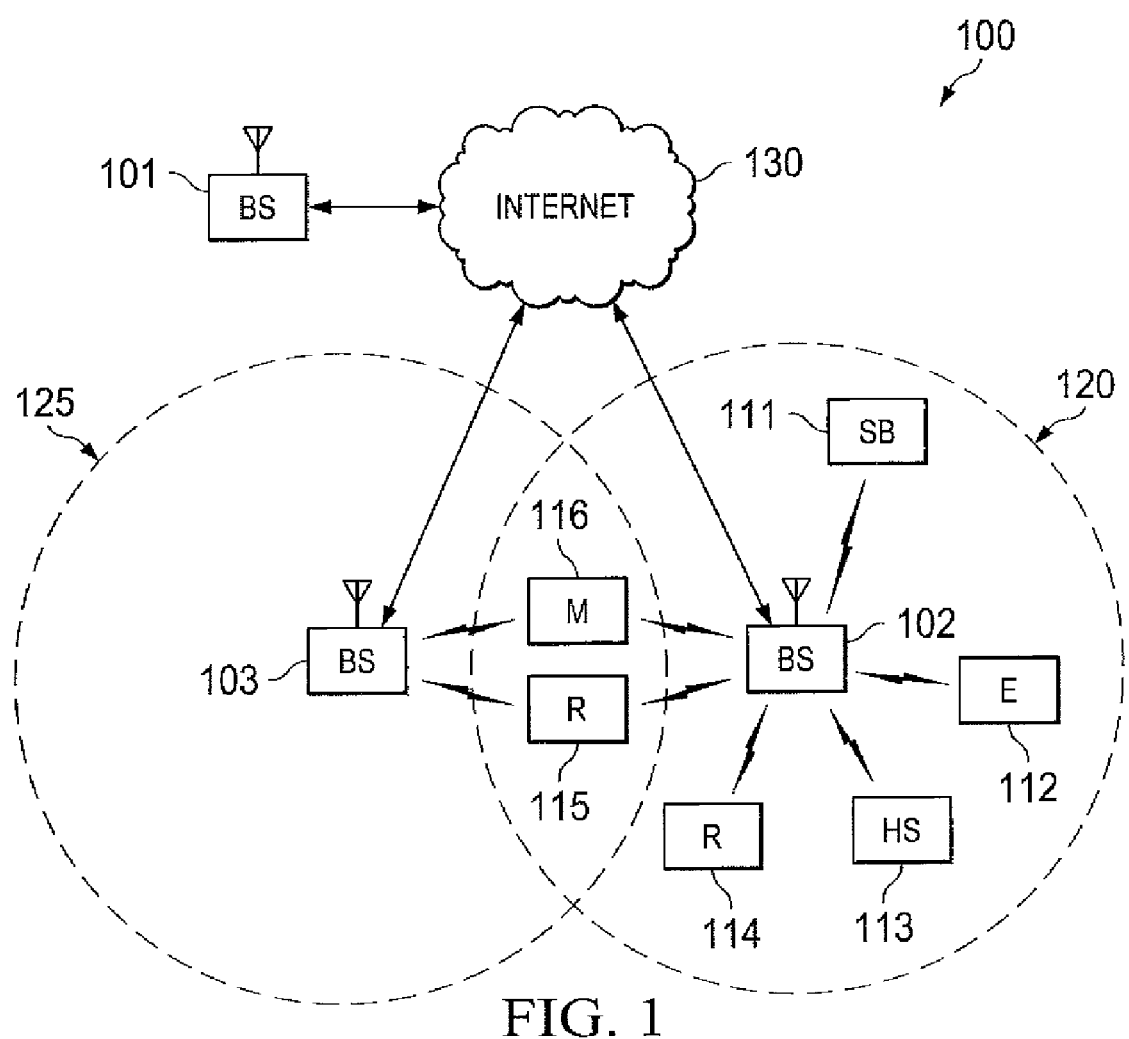
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM. or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
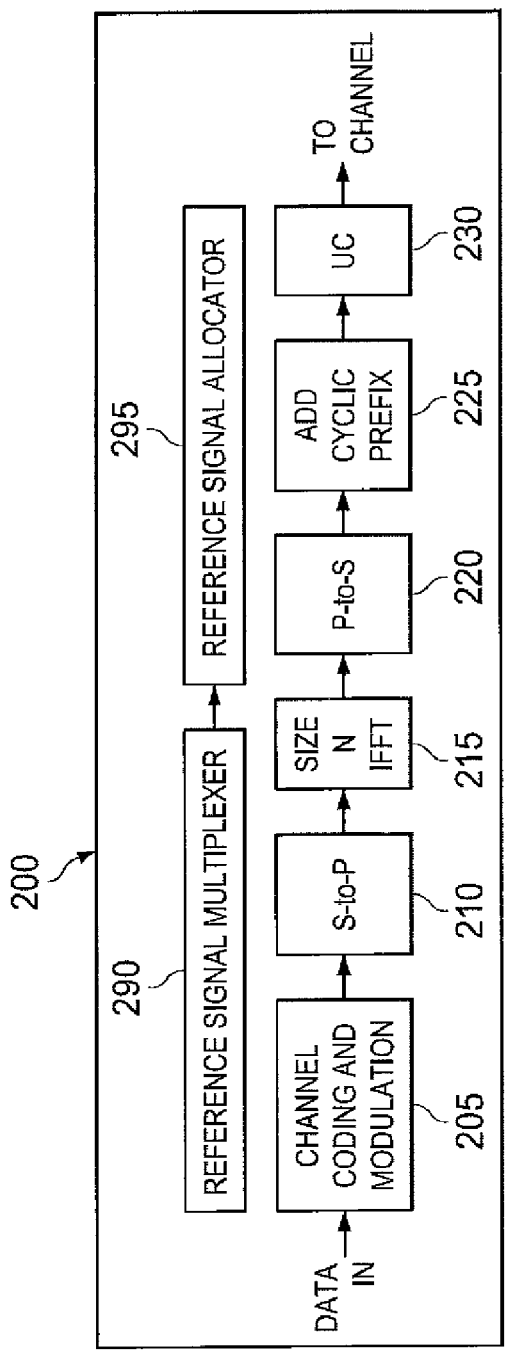
FIG. 2 is a high-level diagram of an OFDMA transmitter according to one embodiment of the disclosure.
Figure 3:
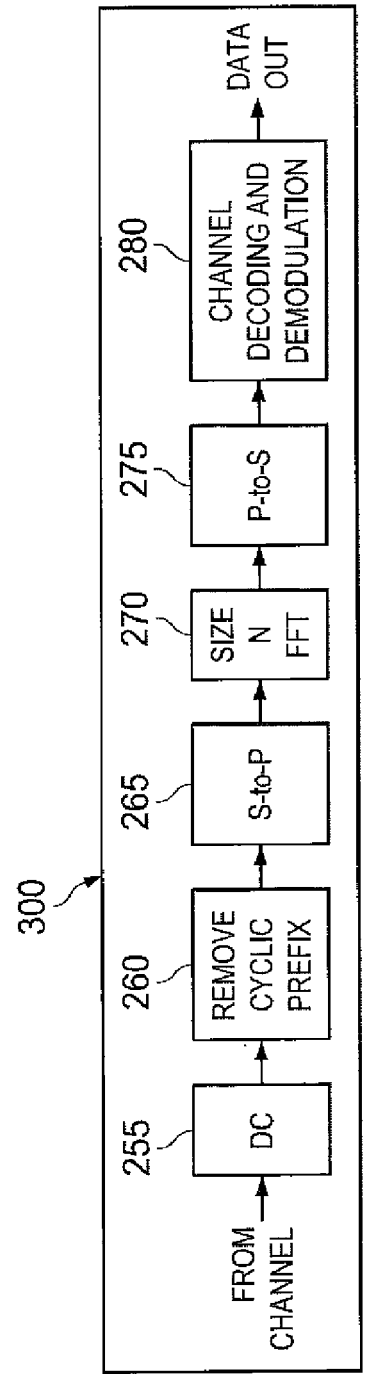
FIG. 3 is a high-level diagram Of an OFDMA receiver according to one embodiment of the disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL}N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSS) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission of Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

The CRSs mapped for antenna ports 0, 1, 2 and 3 are transmitted in the RBs in these 10 subframes. The primary synchronization signal (PSS) and secondary synchronization signal (SSS) are transmitted in the last two OFDM symbols in the first slot of subframes #0 and #5 using a subset of consecutive subcarriers located in the center of the system bandwidth.

In some cases, an advanced wireless communication system is built upon an existing wireless communication system by changing the base station's behavior. Old-type subscriber stations may still be able to connect to and exchange packets with the new base station in the old way, and at the same time, new-type subscriber stations connect to and exchange packets with the same new base station in the new way. In such a scenario, the existing system is referred to as the "legacy system" while the advanced system is referred to as the "advanced system". Similarly, the subscriber stations that connect to the base station in the old way are referred to as "legacy subscriber stations (or legacy UEs)" while those subscriber stations that connect to the base station in the new way are referred to as "advanced subscriber stations (or advanced UEs)". For example, if a 3GPP Rel-8 long-term evolution (LTE) system has been upgraded to a 3GPP Rel-10 LTE-Advanced system with eNodeB's supporting the Rel-8 UEs as well as Rel-10 UEs, then the LTE system is a legacy system and the LTE-advanced system is an advanced system.

In an OFDM wireless communication system, reference signals (RSs) are transmitted in some designated resource elements (REs) in the time-frequency grid within the system bandwidth in subframes. An advanced system may have some REs for RSs (called RS REs) for legacy subscriber stations as well as other RS REs for advanced subscriber stations in the time-frequency grid.

A reference signal (RS) mapping pattern is defined as a set of resource elements (REs) in one resource block (RB) spanning two slots (or one subframe), where the pattern repeats every RB in a subset or in the set of RBs in the system bandwidth.

RS REs may reside in only one slot or in both slots in an RB in one subframe.

The present disclosure describes a method and system for cell-specific shifting of reference signals in multi-stream transmissions.

Figure 4:
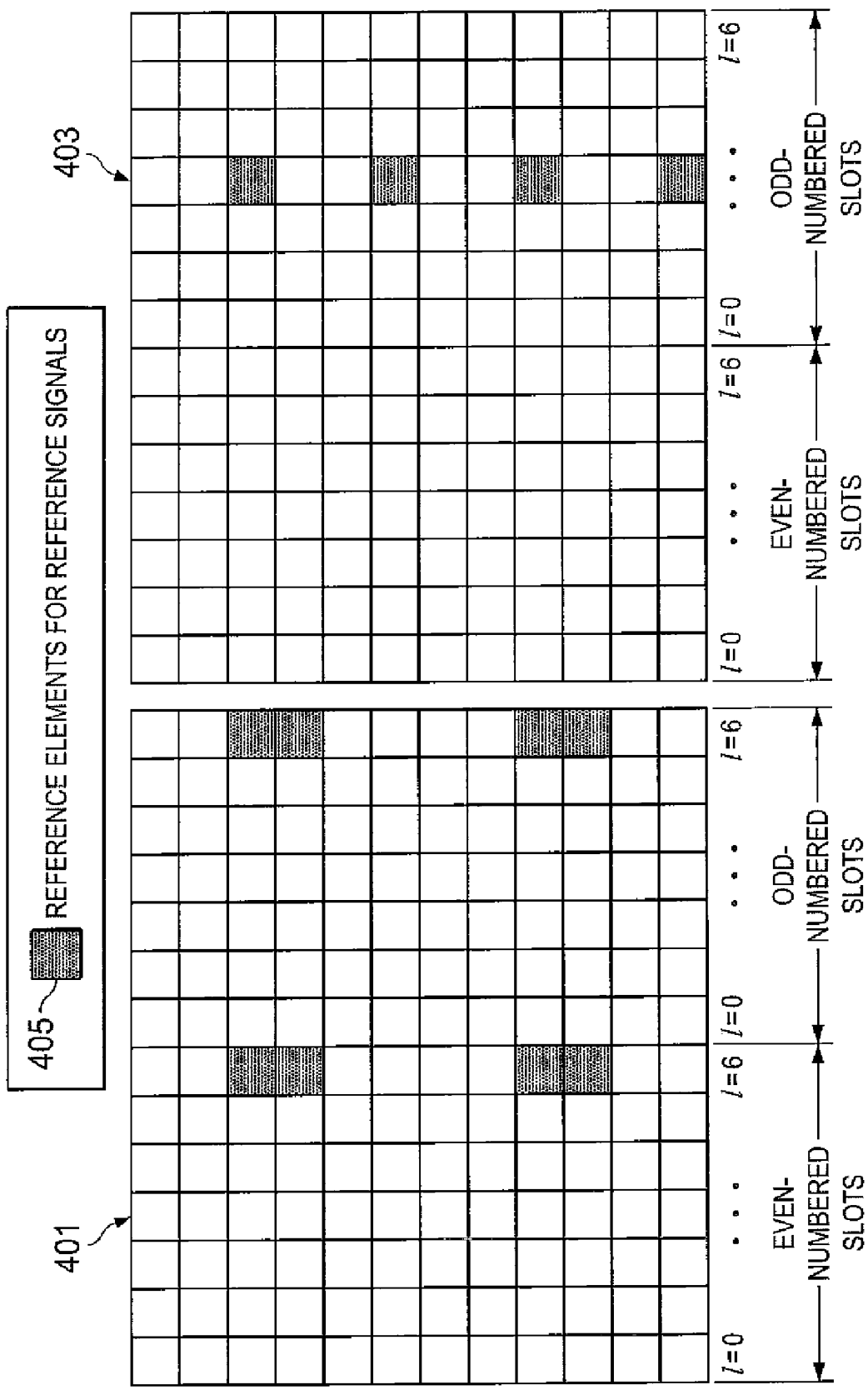
FIG. 4 illustrates reference signal mapping patterns according to embodiments of the present disclosure.

FIG. 4 illustrates reference signal mapping patterns according to embodiments of the present disclosure.

FIG. 4 shows a reference signal pattern 401 and a reference signal pattern 403. In reference signal pattern 401, the RS REs 405 are present in both slots at OFDM symbol 6. Of course, one of ordinary skill in the art would recognize that similar RS mapping patterns can be constructed by choosing different OFDM symbols for the RS REs 405. On the other hand in reference signal pattern 403, the RS REs 405 are present only in one slot, which is slot 1 in the subframe.

An RS mapping pattern can be provided for estimating channel state information (CSI) at the receiver side for multiple Tx antenna-port channels, where CSI includes channel quality information (CQI), rank information (RI), precoding matrix information (PMI), channel direction information (CDI), and so forth. This type of RS is referred to as a CSI-RS in the present disclosure.

An RS mapping pattern also can be provided for demodulation (DM) at the receiver. This type of RS is referred to as a DM-RS in the present disclosure.

An RS mapping pattern can further be provided for both purposes, i.e., for estimating CSI and demodulation at the UEs.

An advanced wireless communication system has some RS REs for advanced UEs (denoted by advanced RS REs), while some RS REs are for legacy UEs (denoted by legacy RS REs). Advanced UEs may read reference signals from both types of RS REs, i.e., advanced UEs may read RS REs for advanced UEs and/or legacy UEs. Conversely, legacy UEs may only read reference signals from RS REs for legacy UEs.

In one embodiment of the present disclosure, an RS pattern for advanced UEs is defined such that within each OFDM symbol, the RS REs are split into groups with each group having 2 consecutive REs. In a particular embodiment, each group of 2 REs will start at an even subcarrier index to avoid space-frequency block code (SFBC) interference between the advanced RS REs and legacy data REs when the legacy UE is using SFBC or SFBC-frequency switching transmit diversity (FSTD) transmission. In this case, the SFBC scheme pairs two data REs in the 2k and (2k+1) subcarriers, where k is the subcarrier index. Here, the advanced RS pattern can be used for either CSI-RS or DM RS, or both.

Figure 5A:
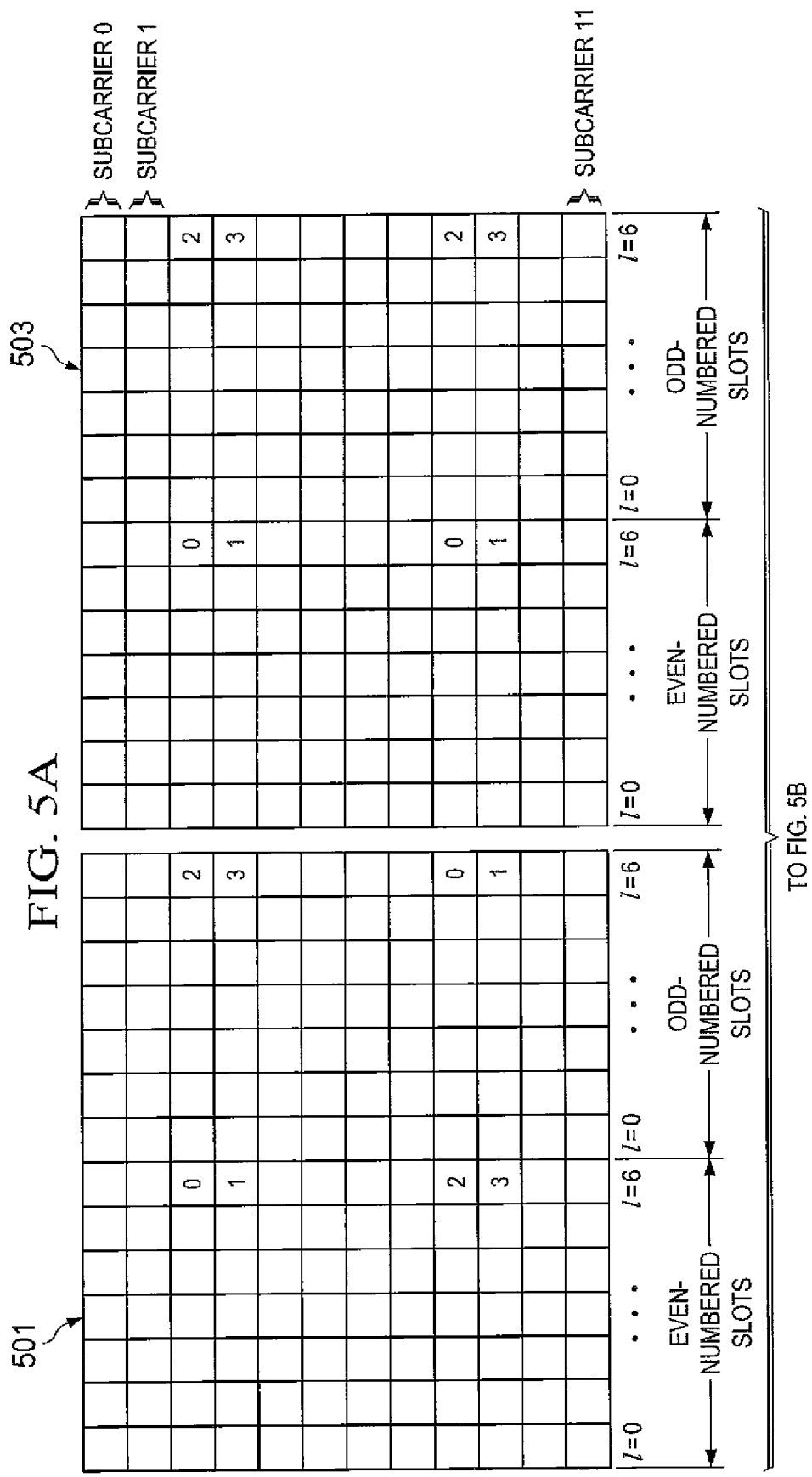
FIGS. 5A and 5B illustrate reference signal mapping patterns according to embodiments of the present disclosure.
Figure 5B:
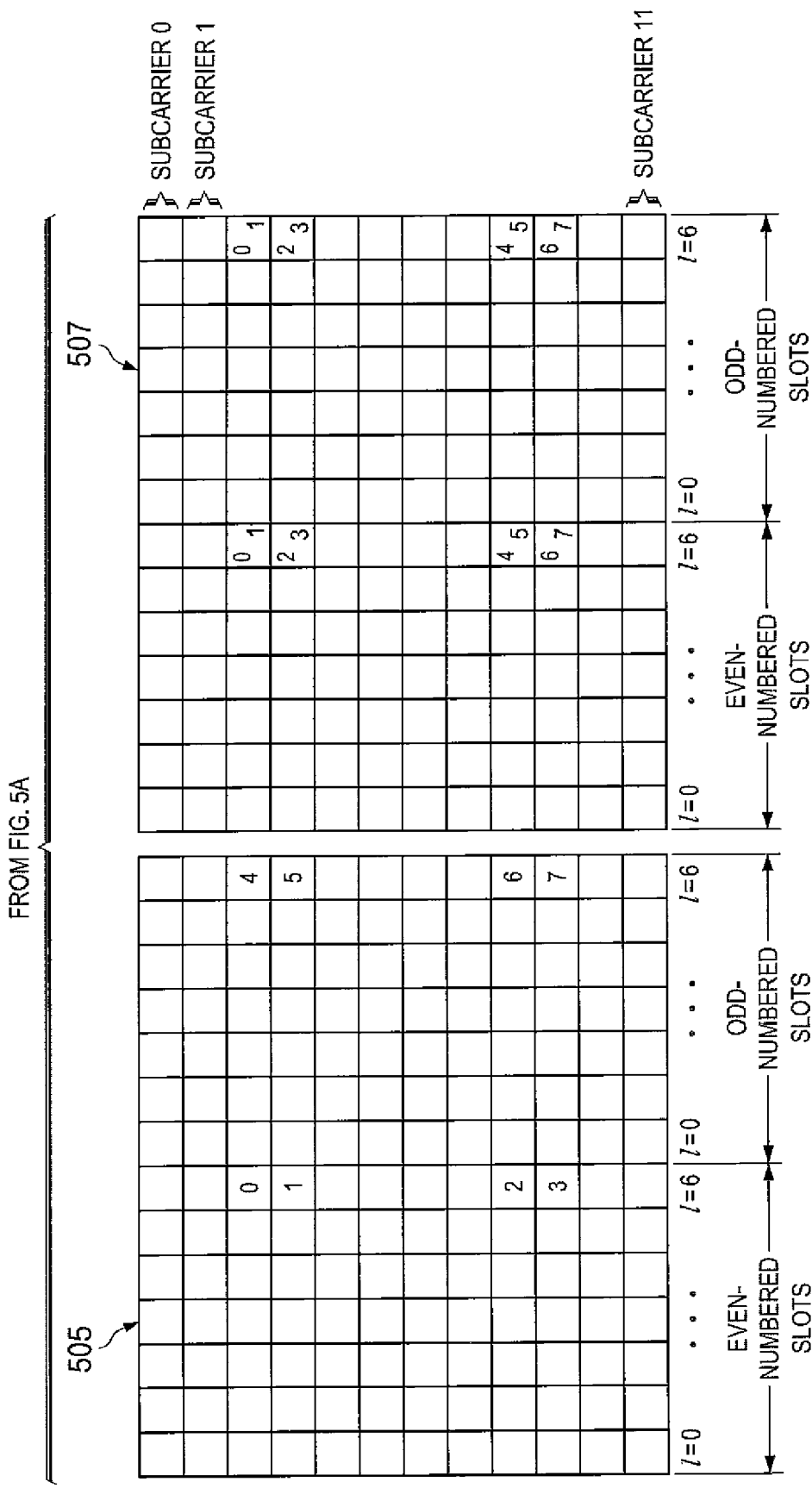

FIGS. 5A and 5B illustrate channel state information (CSI) reference signal (RS) mapping patterns according to embodiments of the present disclosure.

FIG. 5A shows a CSI-RS pattern 501 and a CSI-RS pattern 503. FIG. 5B shows a CSI-RS pattern 505 and a CSI-RS pattern 507. In CSI-RS patterns 501-505, the numbers on the RS REs represent the antenna port numbers defined in the advanced system, where onto the RS Res labeled with i, the RS for antenna port i will be mapped. In the CSI-RS pattern 505, the two number labels on the RS REs represent the two antenna port numbers defined in the advanced system, where two RSs for the two antenna ports are code-division-multiplexed (CDMed) with a spreading factor of 2.

FIGS. 6A1, 6A2, 6B1 and 6B2 illustrate reference signal mapping patterns circularly shifted according to embodiments of the present disclosure.

In this embodiment, the RS REs for advanced UEs are circularly shifted in the subcarrier or frequency domain in the same way as the RS REs for legacy UEs as the cell-id increases. Circular shifting refers to a type of RS RE shifting that results in at least one RE being shifted out of the boundary of a set of consecutive subcarriers. In this case, the RS RE that is "shifted-out" will be located at the subcarrier opposite from the end of the set where the RS REs were "shifted-out", i.e., will be wrapped around, where the number of subcarrier in a set can be 6 subcarriers, 12 subcarriers (i.e., one RB), or any other value. Circular shifting also is described in the U.S. patent application filed Oct. 2, 2009 and assigned Ser. No. 12/587,164, which is hereby incorporated by reference as if fully set forth herein.

In a particular example, two cells each have a cell-id, and the cell-ids differ by 1. In this case, the legacy RS REs in one cell are circularly-shifted from those in the other cell by one subcarrier. Furthermore, the advanced RS REs in one cell are circularly-shifted from those in the other cell by one subcarrier as well.

As shown in FIGS. 6A1 and 6A2, both the advanced RS REs 619 and the legacy RS REs 617 of RS pattern 601 are circularly shifted by 1, and the RS REs that are "shifted-out" are located at the subcarrier opposite from the end of the set where the RS REs were "shifted-out". Circularly shifting RS pattern 601 in this way results in RS pattern 603. In a particular embodiment, the cell-specific RS shift $v_{shift}$ for each antenna port is given in terms of an equation such as $v_{shift}=N_{cell-id} \mod 6$, and $v_{shift}=N_{cell-id} \mod 12$, for example.

Similarly, the result of circularly shifting RS pattern 605 as described results in RS pattern 607. The result of circularly shifting RS pattern 609 as described results in RS pattern 611, and the result of circularly shifting RS pattern 613 as described results in RS pattern 615.

FIGS. 7A1, 7A2, 7B1 and 7B2 illustrate reference signal mapping patterns circularly shifted according to further embodiments of the present disclosure.

In one embodiment, the RS REs for advanced UEs are circularly shifted in the subcarrier or frequency domain as the cell-id increases in a different manner from those RS REs for legacy UEs. For example, the RS REs for advanced UEs do not shift with different cell-ids even though the RS REs for legacy UEs may circularly shift.

As shown in FIG. 7A1, the base pattern with cell-id=n for RS pattern 701 corresponds with RS pattern 601 in FIG. 6A1. In this example, the legacy RS REs 717 are circularly shifted by 1, and the advanced RS REs 719 of RS pattern 701 remain unshifted. In this example, the cell-specific RS shift $v_{shift}$ for each antenna port is given in terms of equation by, $V_{shift}=0$.

Similarly, the base pattern with cell-id=n for RS pattern 705 corresponds with RS pattern 605 in FIG. 6A2, and the result of circularly shifting RS pattern 605 as described results in RS pattern 705. The base pattern with cell-id=n for RS pattern 709 corresponds with RS pattern 609 in FIG. 6B1, and the result of circularly shifting RS pattern 609 as described results in RS pattern 709. The base pattern with cell-id=n for RS pattern 713 corresponds with RS pattern 613 in FIG. 6B2, and the result of circularly shifting RS pattern 613 as described results in RS pattern 713.

In another embodiment, the RS REs for advanced UEs circularly-shift by m times more subcarriers than those for legacy UEs, where m can be any integer. In a particular embodiment, the resource elements are grouped into one or more sub-groups. Each of the one or more sub-groups has two or more contiguous resource elements in the frequency domain, and each of the one or more sub-groups has a same number of resource elements indicated by m. Shifting the sub-groups by an integer multiple of the number of resource elements in each sub-group prevents overlap with the reference signal mapping patterns of other cells in the subcarrier or frequency domain. In the embodiment shown in FIGS. 7A and 7B, m would be 2.

As shown in FIG. 7A1, the base pattern with cell-id=n for RS pattern 703 corresponds with RS pattern 601 in FIG. 6A1. In this example, the legacy RS REs 717 are circularly shifted by 1, and the advanced RS REs 719 of RS pattern 703 are circularly shifted by 2. In this example, the cell-specific RS shift $v_{shift}$ for each antenna port is given in terms of an equation such as $v_{shift}=(2N_{cell-id}) \bmod 6$ or $v_{shift}=(2N_{cell-id}) \bmod 12$, for example.

Similarly, the base pattern with cell-id=n for RS pattern 707 corresponds with RS pattern 605 in FIG. 6A2, and the result of circularly shifting RS pattern 605 as described results in RS pattern 707. The base pattern with cell-id=n for RS pattern 711 corresponds with RS pattern 609 in FIG. 6B1, and the result of circularly shifting RS pattern 609 as described results in RS pattern 711. The base pattern with cell-id=n for RS pattern 715 corresponds with RS pattern 613 in FIG. 6B2, and the result of circularly shifting RS pattern 613 as described results in RS pattern 715.

Figure 8:
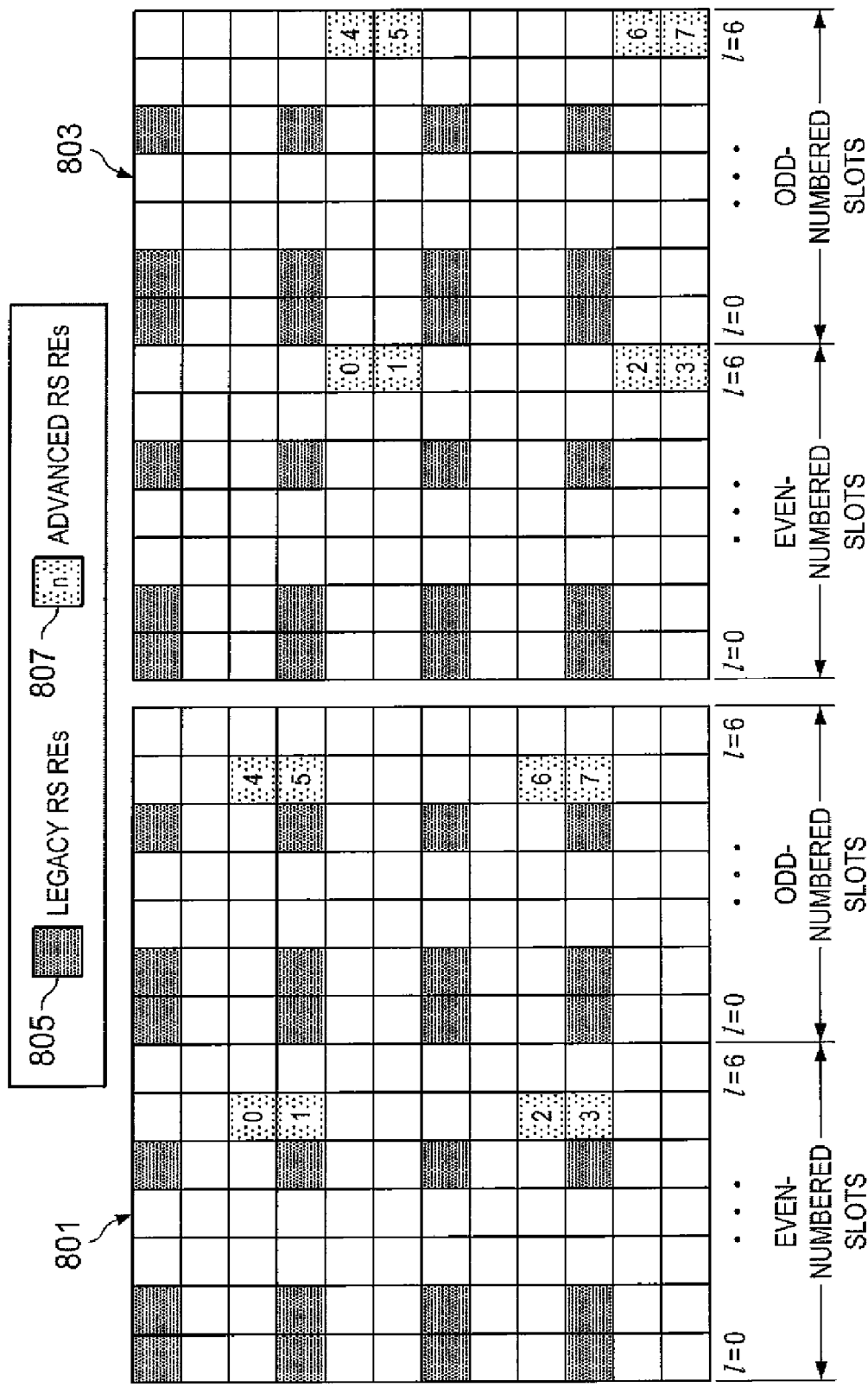
FIG. 8 illustrates reference signal mapping patterns circularly shifted according to yet further embodiments of the present disclosure.

FIG. 8 illustrates reference signal mapping patterns circularly shifted according to yet further embodiments of the present disclosure.

In one embodiment of the present disclosure, the advanced RS REs 807 in one OFDM symbol are circularly shifted in the time domain by a value of $h_{shift}$ to another OFDM symbol where no legacy RS REs 805 are present as the cell-id increases.

In a particular embodiment, when the cell-id further increases, the advanced RS REs are circularly shift to the left or the right to an OFDM symbol that is not occupied by legacy RS REs. For example, the advanced RS REs in each slot of RS pattern 505 of FIG. 5B shifts from OFDM symbol 6 to OFDM symbol 5 on the same subcarriers as cell-id changes from n to n+1. The result of circularly shifting RS pattern 505 as described results in RS pattern 801.

Although the horizontal shift in The time domain is described in terms of a single shift to an adjacent OFDM symbol, one of ordinary skill in the art would recognize that the shift in the time domain may be across two or more OFDM symbols, e.g., the cell-id changes from n to n+2 or n+3.

In another embodiment, the advanced RS REs 807 in one OFDM symbol in a slot shift in both the time and subcarrier domain as the cell-id changes. The advanced RS REs 807 may shift in time-domain first, and then in frequency-domain later as the cell-id increases. The advanced RS REs 807 also may shift in frequency-domain first, and then in time-domain later as the cell-id increases.

For example, considering the RS pattern 505 of FIG. 5B, it is assumed that both OFDM symbols 5 and 6 can be used for transmitting the advanced RS REs. As cell-id changes from n to n+1, the advanced RS REs in OFDM symbol 6 shifts to OFDM symbol 5 on the same subcarriers as illustrated by RS pattern 801. As the cell-id further increases to n+2, the advanced RS REs 807 shift to OFDM symbol 6, while at this time, the advanced RS REs 807 also shift in frequency domain as well to different subcarriers resulting in RS pattern 803.

Shifting the RS pattern as described in the present disclosure ensures multiple locations among multiple cells as overlap of the reference signal mapping patterns is avoided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station comprising:
    a downlink transmit path comprising circuitry configured to transmit a plurality of reference signals in one or more subframes, each subframe comprising one or more resource blocks, each resource block comprising S number of Orthogonal Frequency Division Multiplexing (OFDM) symbols, each of the S OFDM symbols comprising N number of subcarriers, and each subcarrier of each OFDM symbol comprises a resource element; and
    a reference signal allocator configured to:
        allocate the plurality of reference signals to selected resource elements of a resource block, and
        circularly shift the plurality of reference signals in a time domain of the resource block by an $h_{shift}$ value that is based at least partly upon a cell_ID of the base station.

2. A base station in accordance with claim 1 wherein the reference signal allocator is further configured to:
    group the selected resource elements into one or more sub-groups, wherein each of the one or more sub-groups has two or more contiguous resource elements in a frequency domain, and wherein each of the one or more sub-groups has a same m number of resource elements, and
    circularly shift each of the one or more sub-groups of resource elements in the frequency domain by a $v_{shift}$ value, the $v_{shift}$ value being an integer multiple of the m number of resource elements in each of the one or more sub-groups.

3. A base station in accordance with claim 2 wherein the $v_{shift}$ value is given by one of the following equations:

$$v_{shift} \text{ value}=mN_{cell-id} \bmod 6 \text{ and}$$

$$v_{shift} \text{ value}=mN_{cell-id} \bmod 12.$$

4. A base station in accordance with claim 2 wherein the circular shift in the frequency domain occurs prior to the shift in the time domain.

5. A base station in accordance with claim 2 wherein the circular shift in the time domain occurs prior to the circular shift in the frequency domain.

6. A subscriber station comprising:
    a downlink receive path comprising circuitry configured to receive a plurality of reference signals in one or more subframes, each subframe comprising one or more resource blocks, each resource block comprising S Orthogonal Frequency Division Multiplexing (OFDM) symbols, each of the S number of OFDM symbols comprising N number of subcarriers, and each subcarrier of each OFDM symbol comprises a resource element; and
    a reference signal receiver configured to receive the plurality of reference signals allocated to selected resource elements of a resource block,
    wherein, prior to reception by the subscriber station, the plurality of reference signals are circularly shifted in a time domain of the resource block by an $h_{shift}$ value that is based at least partly upon a cell_ID of a base station.

7. A subscriber station in accordance with claim 6 wherein, prior to reception by the subscriber station,
    the selected resource elements are grouped into one or more sub-groups, wherein each of the one or more sub-groups has two or more contiguous resource elements in a frequency domain, and wherein each of the one or more sub-groups has a same m number of resource elements, and each of the one or more sub-groups of resource elements are circularly shifted in the frequency domain by a $\upsilon_{shift}$ value, the $\upsilon_{shift}$ value being an integer multiple of the m number of resource elements in each of the one or more sub-groups.

8. A subscriber station in accordance with claim 7 wherein the $\upsilon_{shift}$ value is given by one of the following equations:

$\upsilon_{shift}$ value=$mN_{cell-id}$ mod 6 and $\upsilon_{shift}$ value=$mN_{cell-id}$ mod 12.

9. A subscriber station in accordance with claim 7 wherein the circular shift in the frequency domain occurs prior to the shift in the time domain.

10. A subscriber station in accordance with claim 7 wherein the circular shift in the time domain occurs prior to the circular shift in the frequency domain.

11. A base station comprising:
a downlink transmit path comprising circuitry configured to transmit a plurality of reference signals in one or more subframes, each subframe comprising one or more resource blocks, each resource block comprising S number of Orthogonal Frequency Division Multiplexing (OFDM) symbols, each of the S OFDM symbols comprising N number of subcarriers, and each subcarrier of each OFDM symbol comprises a resource element; and
a reference signal allocator configured to:
   allocate the plurality of reference signals to selected resource elements of a resource block,
   group the selected resource elements into one or more sub-groups, wherein each of the one or more sub-groups has two or more contiguous resource elements in a frequency domain, and wherein each of the one or more sub-groups has a same m number of resource elements, and
   circularly shift each of the one or more sub-groups of resource elements in the frequency domain by a $\upsilon_{shift}$ value, the $\upsilon_{shift}$ value being an integer multiple of the m number of resource elements in each of the one or more sub-groups.

12. A base station in accordance with claim 11 wherein the reference signal allocator is further configured to circularly shift the plurality of reference signals in a time domain of the resource block by an $h_{shift}$ value based at least partly upon a cell_ID of the base station.

13. A base station in accordance with claim 11 wherein the $\upsilon_{shift}$ value is given by one of the following equations:

$\upsilon_{shift}$ value=$mN_{cell-id}$ mod 6 and $\upsilon_{shift}$ value=$mN_{cell-id}$ mod 12.

14. A base station in accordance with claim 12 wherein the circular shift in the frequency domain occurs prior to the shift in the time domain.

15. A base station in accordance with claim 12 wherein the circular shift in the time domain occurs prior to the circular shift in the frequency domain.

16. A subscriber station comprising:
a downlink receive path comprising circuitry configured to receive a plurality of reference signals in one or more subframes, each subframe comprising one or more resource blocks, each resource block comprising S number of Orthogonal Frequency Division Multiplexing (OFDM) symbols, each of the S OFDM symbols comprising N number of subcarriers, and each subcarrier of each OFDM symbol comprises a resource element; and
a reference signal receiver configured to receive the plurality of reference signals allocated to selected resource elements of a resource block,
wherein, prior to reception by the subscriber station,:
   the selected resource elements are grouped into one or more sub-groups, wherein each of the one or more sub-groups has two or more contiguous resource elements in a frequency domain, and wherein each of the one or more sub-groups has a same m number of resource elements, and
   each of the one or more sub-groups of resource elements are circularly shifted in the frequency domain by a $\upsilon_{shift}$ value, the $\upsilon_{shift}$ value being an integer multiple of the m number of resource elements in each of the one or more sub-groups.

17. A subscriber station in accordance with claim 16 wherein, prior to reception by the subscriber station, the plurality of reference signals are circularly shifted in a time domain of the resource block by an $h_{shift}$ value based at least partly upon a cell_ID of the base station.

18. A subscriber station in accordance with claim 16 wherein the $\upsilon_{shift}$ value is given by one of the following equations:

$\upsilon_{shift}$ value=$mN_{cell-id}$ mod 6 and $\upsilon_{shift}$ value=$mN_{cell-id}$ mod 12.

19. A subscriber station in accordance with claim 17 wherein the circular shift in the frequency domain occurs prior to the shift in the time domain.

20. A subscriber station in accordance with claim 17 wherein the circular shift in the time domain occurs prior to the circular shift in the frequency domain.

* * * * *